March 11, 1941 H. HUBBELL Re. 21,743

WIRING TERMINAL FOR ELECTRICAL FITTINGS

Original Filed Sept. 20, 1937

INVENTOR
Harvey Hubbell
BY
Wooster & Davis
ATTORNEYS.

Reissued Mar. 11, 1941

Re. 21,743

UNITED STATES PATENT OFFICE 21,743

WIRING TERMINAL FOR ELECTRICAL FITTINGS

Harvey Hubbell, Long Hill, Conn.

Original No. 2,216,740, dated October 8, 1940, Serial No. 164,632, September 20, 1937. Application for reissue November 16, 1940, Serial No. 365,993

16 Claims. (Cl. 173—330)

This invention relates to new and useful improvements in electrical fittings, and has particular relation to a wiring terminal for electrical fittings.

An object of the invention is to provide a wiring terminal by means of which wires may be quickly and securely attached to or connected with an electrical fitting and without wrapping them about binding screws, but if for any reason it is desired to wire them in the conventional manner the screws can be backed away from their support, the wires wrapped around them under the heads of the screws and then clamped by tightening the screws.

Another object is to provide a means having the characteristics stated and which is of simple and economical construction.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figures 1, 2, 3, 4, 5, 6:
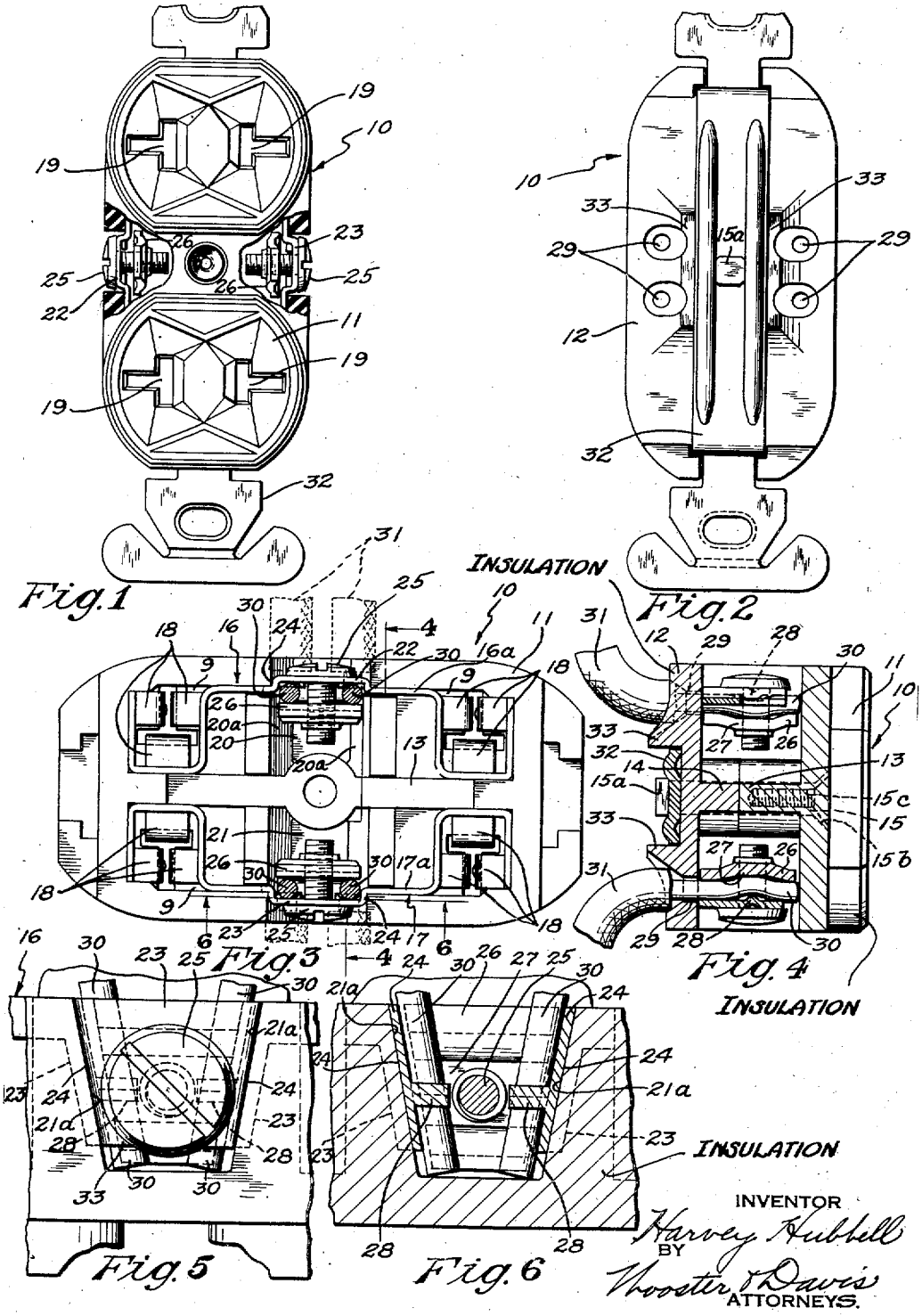
Fig. 1 is a front elevational view of a wall receptacle having the invention incorporated therein, parts being broken away to show the construction.
Fig. 2 is a rear plan view of the receptacle.
Fig. 3 is a view looking into the body or forward portion of the receptacle, the back closure plate being omitted.
Fig. 4 is a transverse sectional view taken along the plane of the line 4—4 of Fig. 3 but through the complete receptacle and showing wires connected with the receptacle contact members.
Fig. 5 is a detailed side elevational view, on an enlarged scale, showing the terminal.
Fig. 6 is a detailed sectional view taken along the line 6—6 of Fig. 3.

While the invention is shown in the accompanying drawing and herein described as embodied in a wall receptacle it is to be understood that the invention is not limited to such an application as it may be used in other types of electrical fittings. In the drawing a receptacle generally designated 10 is shown as including a forward or body portion 11 and a rear or closure portion 12 each formed, as for example by molding, of suitable insulating material. The mentioned parts are provided with web portions 13 and 14 which in the assembled device abut as shown in Fig. 4 and the parts may be secured together as by a screw or rivet 15 extending through member 12 and the usual mounting yoke 32 against which its head 15a seats. The forward end is spread or riveted over as shown at 15b and the forward portion of the rivet is drilled and tapped as shown at 15c to receive the securing screw of the usual finishing or face plate, not shown.

Mounted on the body 11 are a pair of similar contact members 16 and 17 each at its respective ends carrying yieldable resilient or spring contacts 18 positioned to be engaged by contact blades of attachment plug caps inserted through entrance slots 19 in the forward face of the body 11. Intermediate its ends body 11 is provided with similar recesses 20 and 21 which are somewhat wedge shaped or tapered in transverse section, and which open through the sides of the body. Intermediate portions 22 and 23 of the contact members 16 and 17 respectively span the open ends of the recesses 20 and 21 at the sides of body 11.

Such intermediate portions of the contact members are of considerable depth being of much greater width than the adjacent bar-like portions of the contact members as shown in Fig. 5 and their central portions are also offset outwardly from the ends of the body recesses 20 and 21 as indicated at 24. The sides 24 of the mentioned intermediate offset portions are inclined as shown best in Fig. 6 and rest against the similarly inclined side walls 20a and 21a of the recesses 20 and 21 outside the longitudinally extending narrow grooves or recesses 9 in the body 11 which receive the narrow connecting bars 16a and 17a of the contact members connecting the intermediate portions 22 and 23 with the spring contacts 18. Through each of the portions 22 and 23 is passed the shank of a screw 25, and the heads of such screws are disposed at the outer sides of such portions whereby the screws may be operated from outside body 11. It is to be noted that the shanks of the screws extend into the recesses 20 and 21, and within such recesses the said shanks are threaded into floating clamping members 26.

Members 26 (see Fig. 6) are wedge shaped having inclined edges corresponding with the incline of the side walls of the recesses 20 and 21 whereby said members may not turn about the screw shank in the recesses. Each member 26 has its intermediate portion offset or bent inwardly as at 27 and opposite such portions of the members 26, the portions 22 and 23 of the contact members are provided with ribs 28 projecting toward such offsets. The heads of screws 25 are adjacent the outer sides of the body 11 and it will be clear that on turning of the screws in one direction or the other the members 26 on the screw shanks will be moved away from or drawn toward the offset portions 22 of the contact members.

The rear or closure plate 12 of the receptacle is provided with openings 29 entering the receptacle immediately in the rear of or at the inner side of the offset portions of the contact members 16 and 17 and adjacent inclined offset walls 24. These openings are in pairs so related that when wires 30 are inserted through a pair of the openings one wire will have its end disposed at one side of the shank of screw 25 while the other wire will have its end located at the other side of the shank of the same screw.

When installing the receptacle it is but necessary to strip the insulation from the ends of the wires to be connected with the contact members 16 and 17 as the ends 30 of wires 31 are stripped. Then such stripped ends 30 are inserted through the openings 29 into the receptacle and enter between the offset portions 22 and 23 of the contact members and the floating members 26, they being guided by the inclined offsets 24. The screws 25 are then tightened and draw the floating members 26 toward the contact members in a manner whereby the stripped ends 30 of the wires are clamped between the contact members and the floating members. Owing to the offsets 27 and the ribs 28 the clamped or gripped ends of the wires are crimped or bent as shown in Fig. 4 and so are held against casual release and are prevented from turning. This gives sufficient grip on the wires that it is unnecessary to wrap them around the binding screw as is now common practice, but if for any reason it is desired to wire them in the usual or conventional manner, as the head of the binding screw is exposed for manipulation from the side of the body, it can be backed away from the bar, the bared portion of the wire wrapped around the screw and then clamped between the head and member by tightening the screw. This conventional way of connecting the wire to the fitting can thus be used if the electrician is unfamiliar with the new way of wiring by inserting the wire from the back. It can also be used if it is desired not to cut the wire in the wall box. This may be done by merely removing the insulation from a portion of the wire and then wrapping the exposed portion about the screw under the head without cutting the wire and tightening up the screw. In this way the wire is not cut or broken but is continued through the box.

As the stripped ends of the wires are inserted in the manner described they engage the inclined sides 24 of the offset contact portions and are guided inwardly toward the shank of the screw 25. In this way the wire ends are brought close to the screw shank whereby the maximum clamping effort or leverage is obtained and exerted to securely hold the wires in engagement or contact with the members 16 and 17, and there is little danger of bending clamping members 26. It is noted that the relatively wide contact portions 22 and 23 stop short of the bottoms of the recesses 20 and 21 whereby when the wires are properly or completely inserted into place between such contact portions and the floating member 26 the extreme ends of the wires are visible from the exterior of the receptacle, they being exposed below ends 34 of the contact portions 22 and 23 as shown in Fig. 5. Thus it is very easy for the electrician to see whether the wires have been inserted to the proper position, or that is, far enough to make sure they are properly gripped or fastened when the screw is tightened.

Across the back or rear of the receptacle extends the mounting strap or yoke 32 which may be of any or the usual construction. Receptacle portion 12 is built up between this strap and the openings 29 as shown at 33 whereby in the event that a slight extra amount of the wire has had the insulation stripped therefrom such exposed portion of the wire is kept from contact with the mounting strap.

From the above it will be understood that when making an installation involving the new terminal the electrician is not required to wind the lead-in wires about terminal posts and then tighten the latter, but, as indicated above, they can be wired in the usual manner if desired by backing the head of the screw away from the bar, wrapping the wire around the screw and tightening the screw. He merely inserts through the openings 29 the ends of the wires from which the insulation has been stripped, and when the extreme ends of such wires may be seen beyond the ends 34 of the portions 22 and 23 of the contact members the wires are in place, and after the screws 25 are tightened the proper connections have been made. It will also be seen that a single screw secures both wires thus reducing the work required in making the connections. As the ends of the wires are crimped in by the ribs 28 the wires are securely held. It will thus be seen that with my improved wiring terminal the necessary connection to a fitting may be quickly and securely made.

Having thus set forth the nature of my invention, what I claim is:

1. In an electrical fitting, a body of insulating material having a recess therein opening through a side thereof, a contact bar on said body including a portion spanning the open side of said recess, said spanning portion of the bar comprising a relatively wide portion, a screw passing through said portion to one side of the bar proper and having its shank in the recess, a floating member on the screw within the recess and shiftable by the screw to clamp a wire against said bar portion, said body having an opening positioned for the insertion of a wire end between said floating member and said bar portion, said recess being of such depth as to expose the end of said wire below said relatively wide bar portion when the wire is fully inserted into place between the member and bar portion, and said bar portion being offset outwardly with respect to the recess and having its sides inclined to direct inwardly toward the shank of said screw any wire inserted through said opening.

2. In an electrical fitting, a body of insulating material having a recess therein opening through a side thereof, a contact bar including a portion spanning the open side of said recess, a screw passing through said spanning portion of the bar and having its shank in said recess, a floating member on the screw within the recess and shiftable by the screw to clamp a wire against said bar portion, said body having an opening positioned for the insertion of a wire therethrough into a position between said member and said bar portion, and said bar portion being offset outwardly with respect to the recess and having its sides inclined to direct inwardly toward the shank of said screw any wire inserted through said opening.

3. An electrical fitting comprising a body of insulating material having a transversely extending tapered recess opening through one side thereof, a contact in said body including a bar member extending across said recess, a floating member in the recess at one side of said bar member and guided by the sides of the recess, a binding screw in the recess accessible for operation through the opening at the side of the body, said screw extending through one of the members and threaded in the other member to clamp the free ends of a plurality of lead wires between said members, and one of said members being offset on opposite sides of the screw to provide guide shoulders for the free ends of the lead wires and arranged with said offsets seated against the side walls of the recess.

4. An electrical fitting comprising a body of insulating material having a transversely extending tapered recess opening through one side thereof, contacts in said body including a bar member extending across said recess and having an offset portion in the recess providing inclined shoulders seated against the sides of the recess, a floating member in the recess at the open side of said offset portion and guided by the side walls of the recess, a binding screw in the recess accessible for operation through the opening at the side of the body, said screw extending through one of said members and threaded into the other member to clamp the free ends of a plurality of lead wires between said members, and the inclined side walls of the offset portion providing guides for the free ends of the lead wires to guide them inwardly toward the screw when they are inserted between the members.

5. An electrical fitting comprising a body of insulating material having a transversely extending recess opening through one side thereof, contacts in the body connected by a bar portion located in and extending across the recess, a floating member in the recess at one side of the bar member and guided by the sides of the recess, a binding screw in the recess accessible for operation through the opening at the side of the body, said screw extending through one of said members and threaded into the other member to clamp the free ends of one or more wires between them, and one of said members having an offset portion providing inclined guide walls on opposite sides of the screw to guide the free ends of the wires inwardly toward the screw as they are inserted between the members.

6. In an electrical fitting, a body of insulating material having a recess therein opening through a side thereof, a contact bar on said body including a portion spanning the open side of said recess, said spanning portion of the bar comprising a relatively wide portion, a screw passing through said portion to one side of the bar proper and having its shank in the recess, a floating member on the screw within the recess and shiftable by the screw to clamp a wire against said bar portion, said body having an opening positioned for the insertion of a wire end between said floating member and said bar portion, said recess being of such depth as to expose the end of said wire below said relatively wide bar portion when the wire is fully inserted into place between the member and bar portion, and said bar portion being offset outwardly with respect to the recess and having its sides arranged to guide any wire inserted through said opening to clamping position.

7. In an electrical fitting, a body of insulating material having a recess therein opening through a side thereof, a contact bar including a portion spanning the open side of said recess, a screw passing through said spanning portion of the bar and having its shank in said recess, a floating member on the screw within the recess and shiftable by the screw to clamp a wire against said bar portion, said body having an opening positioned for the insertion of a wire therethrough into a position between said member and said bar portion, and said bar portion being offset outwardly with respect to the recess and having its sides arranged to guide any wire inserted through said opening to clamping position.

8. An electrical fitting comprising a body of insulating material having a transversely extending recess opening through one side thereof, a contact in said body including a bar member extending across said recess, a floating member in the recess at one side of said bar member and guided by the sides of the recess, a binding screw in the recess accessible for operation through the opening at the side of the body, said screw extending through one of the members and threaded in the other member to clamp the free ends of a plurality of lead wires between said members, and one of said members being offset on opposite sides of the screw to provide guide shoulders for the free ends of the lead wires and arranged with said offsets seated against the side walls of the recess.

9. An electrical fitting comprising a body of insulating material having a transversely extending recess opening through one side thereof, contacts in said body including a bar member extending across said recess and having an offset portion in the recess providing shoulders seated against the sides of the recess, a floating member in the recess at the open side of said offset portion and guided by the side walls of the recess, a binding screw in the recess accessible for operation through the opening at the side of the body, said screw extending through one of said members and threaded into the other member to clamp the free ends of a plurality of lead wires between said members, and the side walls of the offset portion providing guides for the free ends of the lead wires to guide them when they are inserted between the members.

10. An electrical fitting comprising a body of insulating material having a transversely extending recess opening through one side thereof, contacts in the body connected by a bar portion located in and extending across the recess, a floating member in the recess at one side of the bar member and guided by the sides of the recess, a binding screw in the recess accessible for operation through the opening at the side of the body, said screw extending through one of said members and threaded into the other member to clamp the free ends of one or more wires between them, and one of said members having an offset portion providing guide walls on opposite sides of the screw to guide the free ends of the wires as they are inserted between the members.

11. An electrical fitting comprising a body of insulating material including a back wall, a contact member in said body, means for connecting a lead wire to said member comprising a binding screw in the member exposed for operation at the side of the body and retractible outwardly from the contact member to permit wrapping of a lead wire about the screw in the usual manner between the head and the outer side of the contact member and then clamping to the member by tightening the screw, a floating clamping member on the opposite side of the contact member and operable by the screw, and said back wall of the body having an opening for insertion of a lead wire from the back of the body into position between the contact member and the clamp to be clamped to the member by manipulating said screw.

12. An electrical fitting comprising a body of insulating material including a back wall and having a recess opening through its side wall forwardly of said back wall, a contact member in said body, means for connecting a lead wire to said member comprising a binding screw in said recess and exposed for operation from the side of the body, said screw being retractible outwardly from the contact member to permit wrapping of a lead wire about the screw between the head and the outer side of the contact member through the open side of the recess and then clamping to the member by tightening the screw, a floating clamping member in and guided by the recess on the opposite side of the contact member and operable by said screw, and said back wall of the body having an opening leading to said recess for insertion of a lead wire from the back of the body into position between the contact member and the floating member to be clamped to the contact member by manipulation of said screw.

13. An electrical fitting comprising a body of insulating material including a back wall, a contact member in said body, means for connecting a lead wire to said member comprising a binding screw in the member exposed for operation at the side of the body and retractible outwardly from the contact member to permit wrapping of a lead wire about the screw in the usual manner between the head and the outer side of the contact member and then clamping to the member by tightening the screw, a floating clamping member on the opposite side of the contact member and operable by the screw, said back wall of the body being provided with an opening therethrough for insertion of a lead wire from the back of the body into position between the contact member and the floating clamp to be clamped to the member by manipulation of said screw from the side of the body, and said opening being of a size to guide the wire to clamping position and confine it to this position during the clamping operation.

14. An electrical fitting comprising a body of insulating material including a back wall and having a recess opening through its side wall forwardly of said back wall, a contact member in said body, means for connecting a lead wire to said member comprising a binding screw in said recess and exposed for operation from the side of the body, said screw being retractible outwardly from the contact member to permit wrapping of a lead wire about the screw between the head and the outer side of the contact member through the open side of the recess and then clamping to the member by tightening the screw, a floating clamping member in and guided by the recess on the opposite side of the contact member and operable by the screw, said back wall of the body having an opening therethrough leading to said recess for insertion of a lead wire from the back of the body into position between the contact member and the floating member to be clamped to the contact member by manipulation of the screw from the side of the body, and said opening being of a size to guide the wire to clamping position and confine it to this position during the clamping operation.

15. An electrical fitting comprising a body of insulating material including a back wall, a contact member in said body, means for connecting a lead wire to said member comprising a binding screw extending through said member and having a head exposed for operation from the side of the body, said screw being retractible to move the head outwardly from the contact member to permit wrapping of a lead wire about the screw in the conventional manner between the head and the outer side of the contact member and then clamping to the member by the head on tightening the screw, clamping means operable by the screw at the opposite side of said member for securing a lead wire to the member, and said back wall of the body having an opening for insertion of a lead wire from the back of the body into position between the contact member and the clamping means to be connected to the member by manipulation of said screw from one side of the body.

16. An electrical fitting comprising a body of insulating material including a back wall, a contact member in said body, means for connecting a lead wire at the outer and inner sides of said member including a binding screw in the member having a head exposed for operation from one side of the body, said screw being retractible to move the head outwardly from the contact member to permit wrapping of a lead wire about the screw between the head and the outer side of the contact member in the conventional manner and then clamping to the member by the head on tightening of the screw, a floating clamping member on the opposite side of the contact member and operable by the screw, and said back wall of the body having an opening for insertion of a lead wire from the back of the body into position between the clamp and the member to be connected to the member at the rear of said member by manipulation of the screw from the side of the body.

HARVEY HUBBELL.